United States Patent [19]
Rupp

[11] 3,741,692
[45] June 26, 1973

[54] SURGE SUPPRESSOR FOR FLUID LINES

[75] Inventor: Warren E. Rupp, Mansfield, Ohio

[73] Assignee: The Warren Rupp Company, Mansfield, Ohio

[22] Filed: Dec. 17, 1970

[21] Appl. No.: 99,078

[52] U.S. Cl. .................................. 417/540, 130/31
[51] Int. Cl. ....................... F04b 11/00, F16l 55/04
[58] Field of Search ................ 138/30, 31; 417/395, 417/540, 541, 542

[56] References Cited
UNITED STATES PATENTS

| | | | |
|---|---|---|---|
| 3,692,433 | 9/1972 | Finger | 417/395 X |
| 2,780,177 | 2/1957 | Hoehecke | 417/395 |
| 3,299,826 | 1/1967 | Williams | 417/395 |
| 3,391,963 | 7/1968 | Weeks | 417/395 X |
| 3,514,227 | 5/1970 | Rupp | 417/395 |

FOREIGN PATENTS OR APPLICATIONS

| | | | |
|---|---|---|---|
| 636,762 | 2/1962 | Canada | 417/543 |
| 1,014,357 | 12/1965 | Great Britain | 417/540 |

Primary Examiner—William L. Freeh
Assistant Examiner—Leonard Smith
Attorney—Bosworth, Sessions, Herrstrom & Cain

[57] ABSTRACT

A surge suppressor for use with outlet conduits of pumps, such as air-operated diaphragm pumps, having a pulsating output and other fluid conduits that are subject to surges or shock pressures. The apparatus embodies a diaphragm, one side of which is subjected to the pressure of the fluid in the conduit and the other side of which is subjected to the pressure of air within a chamber. Means are provided for automatically compensating for changes in the fluid pressure in the conduit by supplying air to the chamber if the pressure in the conduit increases and automatically bleeding air from the chamber if the pressure decreases, thus maintaining a substantially constant volume of air in the chamber even though the pressure in the conduit to which the device is attached may vary.

13 Claims, 5 Drawing Figures

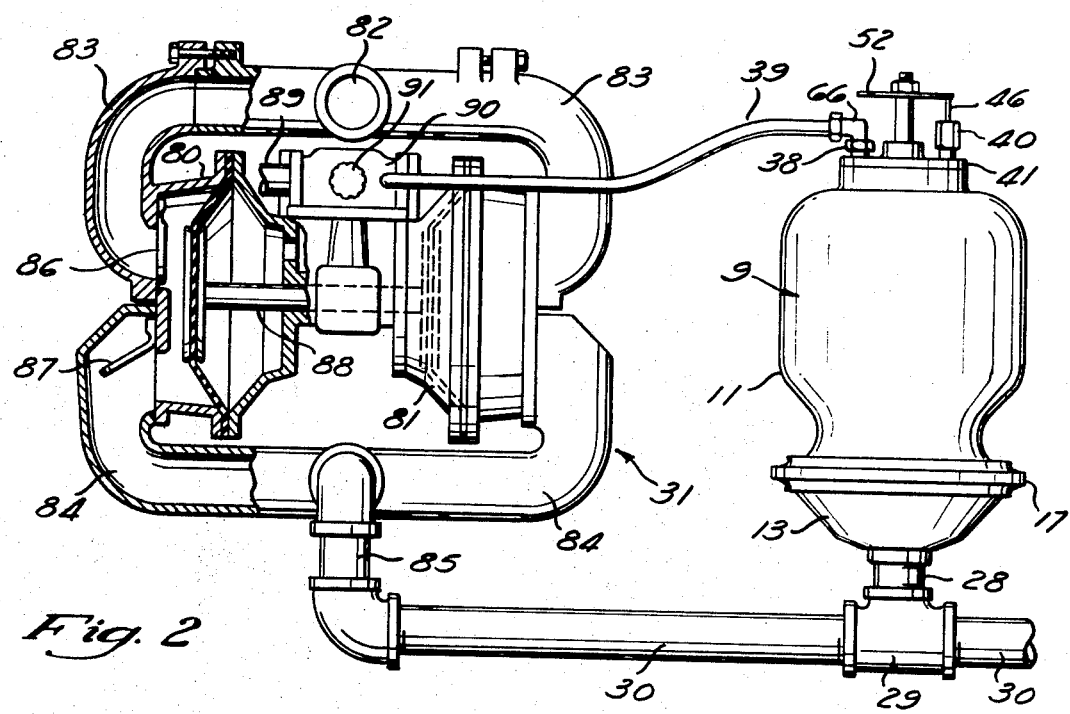
Fig. 2
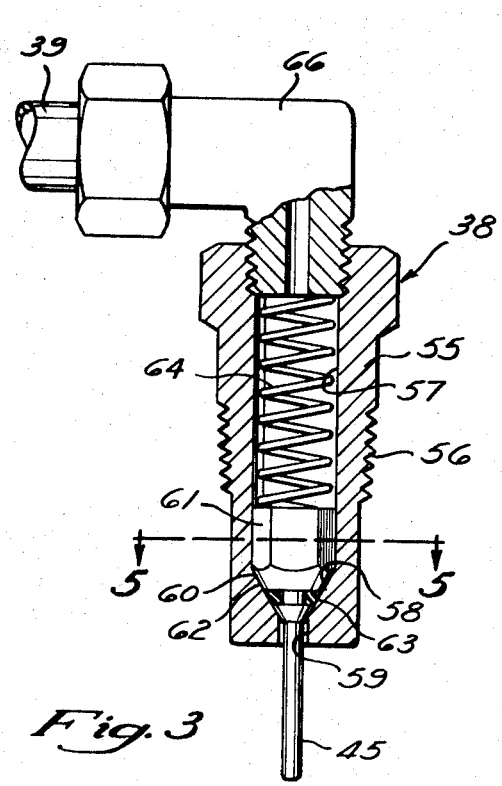
Fig. 3
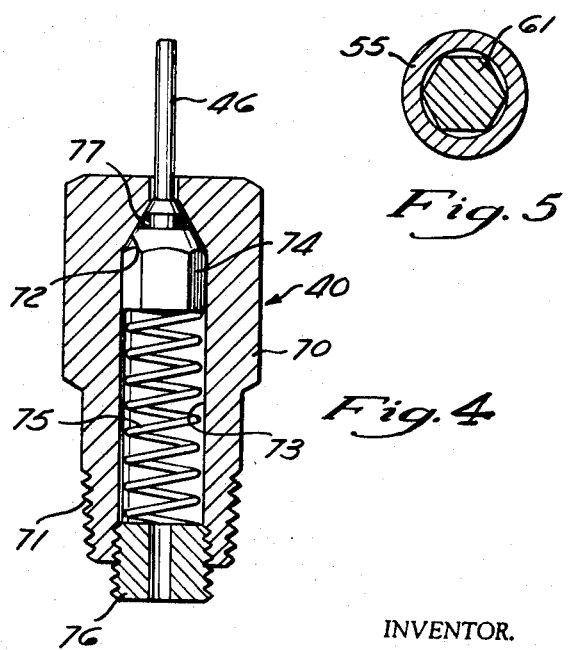
Fig. 4
Fig. 5
INVENTOR.
WARREN E. RUPP
BY Bosworth, Sessions, Herrstrom + Cain
ATTORNEYS

SURGE SUPPRESSOR FOR FLUID LINES

BACKGROUND OF THE INVENTION

This invention relates to a surge suppressor or pulsation absorber for use in conjunction with conduits or piping carrying fluids and which are subject to pressure surges or pulsations resulting, for example, from a pump having a pulsating output or from water hammer or shock pressures caused by rapid closings of valves and the like. The invention relates particularly to a diaphragm type of surge suppressor and to the combination of such a surge suppressor with an air-operated diaphragm type of pump with which the suppressor is particularly effective.

Air-operated diaphragm pumps are widely used, particularly for pumping liquids, solutions, viscous materials and slurries or suspensions containing substantial amounts of solids (the word "liquid" as used herein is intended to include all such material) which may be abrasive. Air-operated diaphragm pumps have a pulsating output and it is desirable to employ pulsation absorbers or surge suppressors in their discharge lines.

Air chambers have long been used as surge suppressors in liquid systems. These simply provide a chamber for air with the bottom of the chamber open to contact with the liquid in the system. Liquid flows into the chamber and the air in the chamber is compressed upon the occurrence of a pulse of increased pressure in the system and the air expands and returns the liquid to the system after the pulse has passed. It has also been proposed to separate the liquid being pumped from the air in the chamber by a diaphragm, bladder or the like to prevent the air from dissolving in the liquid. However, these devices are subject to difficulties for the reason that if the pressure changes in the piping system to which the suppressor is attached, the volume of air above the liquid also changes. At a higher than usual liquid pressure there might be a very small volume of air in the chamber and if a further surge should take place the pressure in the chamber would build up rapidly and the smoothing action of the chamber would be diminished. Also, in surge suppressors of the type embodying a movable dividing member such as a diaphragm or piston between the air and the liquid in the system, the movement of the dividing member is usually limited and if the pressure of air on the dividing member is too high or too low as compared to the pressure of the liquid, then the dividing member may remain at one end of its stroke or the other and the device will be ineffective as a surge suppressor.

SUMMARY OF THE INVENTION

A general object of the present invention is to provide an improved surge suppressor for liquid piping systems in which the difficulties with previously known types of surge suppressors are largely eliminated. Another object of the invention is to provide a diaphragm type surge suppressor that is particularly adapted for use in combination with an air-operated diaphragm pump. Another object is to provide a pumping system embodying an air-operated diaphragm pump and a diaphragm type surge suppressor that will produce an output in which the pulsations are greatly reduced as compared to the pulsations in the output of the pump alone.

Briefly, these and other objects of the invention are attained by providing a surge suppressor comprising a closed chamber containing a gas (ordinarily air) under pressure and having at one end of the chamber a dividing member which preferably takes the form of a flexible diaphragm, but which can be a piston or the like, one side of which is exposed to the gas pressure in the chamber and the other side of which is exposed to the pressure of the liquid in the conduit with which the device is associated. The chamber is provided with an inlet valve connected to a conduit for supplying gas under pressure and an outlet valve through which gas under pressure can be bled from the chamber. These valves are operated by the dividing member in such manner that if the pressure of the liquid in the conduit is such that the dividing member approaches the limit of its movement into the chamber, the inlet valve is opened momentarily to admit gas under pressure into the chamber while if the dividing member approaches the limit of its stroke in momentarily to opposite direction, the outlet valve is opened momentarilyto permit the discharge of gas from the chamber. By this means, the volume of gas within the chamber is maintained substantially constant regardless of changes in pressure of the liquid and the dividing member moves approximately equal distances in both directions from its mid position. Thus, the device operates efficiently and effectively to absorb pulsations and surges regardless of reasonable variations in the pressure in the liquid in the system, and in the case of a device in which the dividing member takes the form of a diaphragm, the diaphragm is not unduly strained in either direction. A system embodying in combination an air-operated diaphragm pump and a diaphragm type surge suppressor is particularly effective and economical inasmuch as the air supply that is used to operate the pump can also be employed to furnish air to the gas chamber of the suppressor.

BRIEF DESCRIPTION OF THE DRAWINGS

FIG. 2 illustrates a system comprising a surge suppressor made according to the invention in combination with an air-operated diaphragm pump of a known type, parts of the pump being broken away for purposes of illustration.

FIG. 3 is a vertical axial sectional view of a preferred form of air inlet valve used in the surge suppressor.

FIG. 4 is a similar view of a preferred form of air outlet valve used in the surge suppressor; and FIG. 5 is a transverse section as indicated by the line 5—5 of FIG. 3.

DESCRIPTION OF A PREFERRED EMBODIMENT

Figure 1:
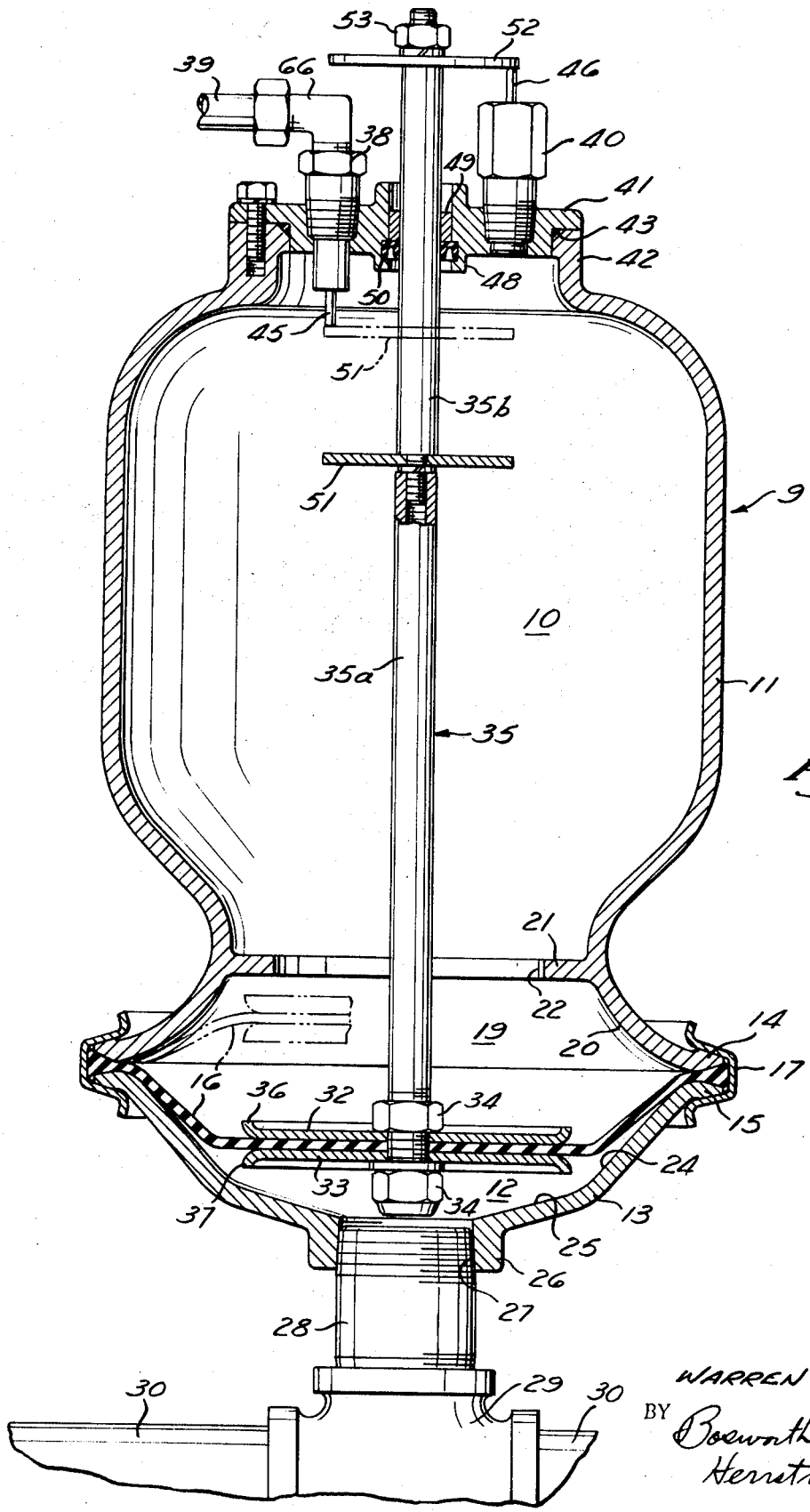
FIG. 1 is a vertical sectional view of a surge suppressor made according to a preferred form of the invention.

As shown in FIG. 1 of the drawing, a surge suppressor 9 made according to a preferred form of my invention comprises an air or other gas chamber 10 within an air chamber housing 11, and a liquid chamber 12 within a liquid chamber housing 13. The housings 11 and 13 are ordinarily in the form of metal castings and circular in cross section. At the bottom of the air chamber housing 11 there is an annular flange 14 and a similar flange 15 is formed at the top of the liquid chamber housing 13. A flexible diaphragm 16 of known construction is clamped between the opposing surfaces of the two flanges and the two housings are secured together by a conventional V-clamp 17. The diaphragm 16 thus separates the air chamber 10 from the liquid chamber 12 so the diaphragm is subjected on one side to the pressure within the air chamber 10 and on the other side to the pressure of the liquid within the liquid chamber 12.

The lower part of the housing 11 and the upper part of the housing 13 define between them a diaphragm chamber 19. The housing 11 extends inwardly and upwardly from the flange 14 to provide a generally conoidal surface 20 which terminates in an inwardly extending flange 21 having a circular opening 22 therein that provides communication between the diaphragm chamber 19 and the air chamber 10. Similarly, the housing 13 extends inwardly and downwardly from the flange 15 to provide a generally conoidal surface 24 of about the same extent as the surface 20. The surface 24 merges into a sloping surface 25 that terminates in a boss 26 having an internally threaded opening 27 that receives a fitting 28. Fitting 28 in turn is connected to a T-fitting 29 that is inserted into a pipe or conduit 30 which may be the discharge conduit that is subjected to pulsations or surges. The under side of diaphragm 16 is subjected to the pressure of the liquid in the conduit 30 while the upper side of the diaphram is subjected to the pressure of the gas in the chamber 10.

The displacement of the diaphragm from its mid position is limited in the upward direction by the surface 20 and in the lower direction by the surface 24. Also, the central portion of the diaphragm is supported by circular plates 32 and 33 that are clamped against the diaphragm by nuts 34 threaded on a rod 35 which, as described below, is employed to operate the valves for controlling the volume of air or other gas in the chamber 10. The plates 32 and 33 are provided with peripheral flanges 36 and 37 that engage the internal flange 21 of the housing 11 and the surface 25 of the housing 13, respectively, to limit positively the extreme displacement of the diaphragm in either direction and thus in conjunction with the surfaces 20 and 24 to prevent the diaphragm from being subjected to unduly large displacement. Normally, as explained below, the maximum stroke of the diaphragm is from a lower position approximately as shown in full lines in FIG. 1 to an upper position as shown approximately in broken lines in FIG. 1.

In order to provide an air chamber having a volume several times the volume displaced by the diaphragm in its normal full stroke, the air chamber housing 11 is enlarged in diameter above the flange 21 to a diameter about equal to the diameter of the diaphragm and extends upwardly a distance sufficient to give the desired volume. An air chamber of substantial volume is important to minimize the changes in pressure within the chamber as the diaphragm reciprocates through a complete stroke. By this mode of operation the deviations in pressure in the line 30 from the mean pressure output are minimized.

It will be evident that in the operation of the surgesupppressor the surge suppressor within the air chamber should be substantially equal to the pressure in the liquid conduit 30. In prior types of surge suppressors, such as the old and well known air chamber, this is accomplished automatically by simply permitting the liquid being pumped to compress the air in the air chamber so that the liquid occupies a greater proportion of the volume of the chamber as the pressure increases and if the pressure in the liquid decreases the air in the chamber expands and some of the liquid is returned from the air chamber to the liquid system. This same action takes place in surge suppressors in which a very thin bladder or diaphragm is employed to separate the liquid being pumped from the gas. The use of a bladder or diaphragm eliminates the difficulties that arise with simple air chambers because of the reduction in volume of air resulting from the dissolution of the air in the chamber in the liquid being pumped. Both types of devices, however, are subject to a serious defect in that as the pressure of the liquid being pumped increases, the volume of air in the chamber decreases. A substantial build up in pressure in the air chamber then takes place with each pulse because of the comparatively small volume of air and this build up prevents devices of this type from effectively absorbing pulsations under varying conditions of operation.

According to the present invention, these difficulties are eliminated by automatically adding air to or bleeding air from the air chamber so as to maintain the volume of air within the chamber substantially constant regardless of changes in pressure in the fluid being pumped within the normal range of operating pressures. This is preferably accomplished by providing at the upper part of the air chamber 10 an air inlet valve 38 connected to a source of air under pressure by a conduit 39, and an air outlet or bleed valve 40 that discharges air from the chamber to atmosphere. The valves 38 and 40 are threaded into suitable openings in a closure member 41 that is secured to the necked-in upper portion 42 of the housing 11, an appropriate gasket 43 being employed to provide a leak proof joint.

In order to operate the valves 38 and 40 so as to maintain the volume of air within the chamber 11 substantially constant, the valves are provided with operating plungers or valve stems 45 and 46, respectively, which open the valves when they are moved inwardly with respect to the valve bodies, the valves being closed and the stems returned by springs as described below. The valves are automatically opened at the required times by the actuating rod 35. Rod 35 is made in two parts, a lower part 35a that is secured to the diaphragm 16 and an extension 35b that extends through an opening in a boss 48 in closure 41. The extension is slidably supported by a bearing sleeve 49 disposed in the boss and a lip type seal 50 prevents leakage of air from the chamber. A circular inlet valve operating plate 51 is clamped between the upper end of the lower portion 35a and the lower end of the extension 35b, extension 35b being threaded into lower portion 35a as shown. A circular outlet valve operating plate 52 is secured to the upper end of the extension as by a nut 53. The location of the plates 51 and 52 on the rod 35 is such that the plate 52 engages the valve stem 46 of the outlet valve and opens the valve when the diaphragm reaches approximately the position shown in full lines in FIG. 1, which is a short distance before the diaphragm reaches the downward limit of its stroke. Similarly, the plate 51 engages the valve stem 45 to move it upwardly into the body of the valve 38 and open the valve 38 when the diaphragm reaches approximately the dotted line position shown in FIG. 1, which is a short distance before the diaphragm reaches the upper limit of its stroke. The valves automatically close when the plates 51 and 52 are moved away from them by the operation of the diaphragm.

In operation, if the pressure in the conduit 30 becomes great enough during a surge or pulse or otherwise to move the diaphragm upwardly beyond its normal maximum stroke, shown by the dotted lines position in FIG. 1, the valve 38 is opened momentarily to admit air from the compressed air line 39. On the other hand, if the pressure in the air chamber exceeds the liquid pressure so that the diaphragm goes downwardly beyond its normal stroke as shown in full lines in FIG. 1, then the plate 52 depresses the plunger 46 and opens the valve 40 to momentarily bleed air out of the chamber 10. This happens repetitively under either condition until a proper balance of pressure is restored. By this means, the pressure of the air within the chamber 10 is varied in accordance with the pressure of the pulsating liquid to maintain the volume of air within the air chamber 10 substantially constant even though the pressure in the product being pumped through the line 30 varies within normal operating limits. This assures effective operation of the surge suppressor with the diaphragm operating in the mid portion of its stroke and prevents the diaphragm from being subjected to undue stress.

While valves of any convenient type can be employed, I prefer to use valves of the type shown in FIGS. 3 and 4. As shown in FIG. 3 the inlet valve 38 has a body 55 with a tapered pipe thread 56 that is threaded into an aperture in the closure member 41. The valve has a cylindrical bore 57 that terminates in a conical valve seat 58 leading to a port 59. A poppet valve member 60 is disposed in the bore 57. This has a hexagonal body portion 61 that guides the valve in the bore and a conical portion 62 that conforms to the conical seat 58 and is provided with a groove to receive an O-ring 63. The valve member terminates in the valve stem 45. The valve member is urged toward the valve seat 58 by a spring 64 that acts between the end of the valve member 60 and an inlet fitting 66 that is threaded into the top of the valve body 55 and forms a connection with the air supply conduit 39. The flats on the hexagonal portion 61 of the valve member provide passages for the flow of air when the valve is opened and there is clearance around the stem 45 to permit air to flow through the port 59 into the air chamber 11. When the stem 45 is contacted by the operating plate 51, the valve member is lifted from its seat 58, disengaging the O-ring 63 from the conical surface 58 and admitting air from the conduit 39 through the fitting 66 and the valve body and into the air chamber 10.

As shown in FIG. 4, outlet valve 40 is basically similar to the valve 38 except that its valve body 70 is provided with pipe threads 71 at its lower end so that it can be threaded into the closure 40, and the conical seat 72 is at the upper end of the bore 73. The valve member 74 is substantially identical with the valve member 60 previously described and is held in normally closed position as shown by a spring 75 that acts between the lower end of the valve member and a fitting 76 screwed into the threaded lower end of the bore 73. In operation, when the operating plate 52 engages the valve stem 46 and depresses the valve member, the O-ring 77 is moved away from the seat 72 and air can flow through the opening in the fitting 76, the central bore of the valve body 70 around the hexagonal portion of valve member 74 and through the clearance space around the valve stem 46 to the atmosphere.

As noted above, the surge suppressor of the present invention is particularly adapted for use with air-operated diaphragm type pumps and a typical arrangement of such a pump and a suppressor made according to the present invention is shown in FIG. 2. The pump 31 is a well-known type of air-operated diaphragm pump and embodies two diaphragm chambers 80 and 81. The material being pumped enters through an inlet or suction port 82 which connects to an inlet manifold 83 leading to both diaphragm chambers and is discharged through an outlet manifold 84 and a discharge pipe 85 that is shown as connected to the conduit 30 to which the surge suppressor 9 is connected.

The diaphragm chambers are provided with flapper-type suction and discharge valves 86 and 87 and the diaphragms in the two diaphragm chambers are connected together by a rod 88. Compressed air is supplied to the pump from any convenient source through a hose 89 leading to fitting 90 and the rate of flow of air to the pump is controlled by a valve operated by a handle 91. A valve actuated by movement of the two diaphragms admits air alternately to the two diaphragms so that the diaphragms are reciprocated in unison, one diaphragm being on the suction stroke, while the other diaphragm is on the pumping stroke.

Pumps of this type are efficient and long-lived because the diaphragms on the pumping stroke are subjected to substantially equal pressure on both sides. Since diaphragms and simple flap valves are employed, wear of the moving parts is minimized and it is possible to pump slurries, solutions containing highly abrasive materials and many products that ordinary piston type or centrifugal type pumps are not able to handle efficiently. When the pumps are used in combination with surge suppressors embodying the present invention, the air supply conduit 39 for the surge suppressor preferably is connected to the air supply to the pump itself, the conduit 39 being connected to the fitting 90 in the present embodiment. Thus, the pressure supplied to the surge suppressor is substantially the same as the pressure supplied to the pump. Therefore, the pressure supplied to the suppressor is always adequate properly to correct the air pressure in the chamber 11 regardless of whether the pump is operated at high or low air pressure.

Furthermore, the fact that the pump and the surge suppressor are both diaphragm type devices with the material being pumped on one side of the diaphragm and air on the other side in each case, appears to be advantageous with respect to smoothness of operation and effectiveness of eliminating pulsation from the pump discharge. It is convenient to employ a suppressor having a diaphragm of the same size and type as the diaphragms of the pump with which the suppressor is to be used so that the user needs only to stock one size and type of diaphragm for service purposes; however, so long as the suppressor is of adequate size to sufficiently absorb the surges to which it is subjected without requiring undue movement of the diaphragm, this is not necessary.

The surge suppressor made according to the present invention operates effectively to reduce pulsations in the discharge of pumps and in particular in combination with a diaphragm pump, the pulsations are reduced so that they are almost unnoticeable in the discharge piping on the side of the surge suppressor away from the pump. The operation of the suppressor can be observed inasmuch as the movement of the projecting portion 35b of the rod 35 and plate 52 are visible. In operation, when the pump is started up with atmospheric pressure in the chamber 10, the disc 51 contacts the end of the valve stem 45 and opens the inlet valve 38 on each stroke until pressure in the chamber has been built up sufficiently to limit the upward stroke of the diaphragm and the disc 51 to a point where no contact is made between the disc and the valve stem. As long as condition remain steady, the inlet valve 38 and the outlet valve 40 are operated infrequently, if at all. However, if the pressure in the conduit 30 is increased the disc 51 will contact the valve stem 45 for a few strokes, admitting more air to the air chamber 10 and balancing the discharge pressure; if the pressure in the line 30 is decreased then the air pressure within the chamber 10 will force the diaphragm downwardly a greater distance and if the pressure is decreased sufficiently the actuating disc 52 will engage the valve stem 46 for several strokes, bleeding air out of the chamber with each stroke until the proper balance is again achieved.

From the foregoing, it will be evident that the inventio provides a simple surge suppressor for liquid systems that can be manufactured at reasonable costs and which operates effectively to absorb surges or pulses under varying conditions in the system to which it is attached. In service the absorber requires no attention or adjustment and since both sides of the diaphragm are subjected to substantially equal pressures and the diaphragm is prevented from unduly long strokes, the suppressor is long-lived in service.

While the suppressor has been illustrated herein in combination with a diaphragm type pump with which it is particularlyeffective, it is to be understood that the suppressor is useful in conjunction with pumps of other types and in other liquid systems that are subjected to pulsations or surges caused by operation of pumps, valves or the like. In all applications to which the suppressor is suited, the low rate of buildup of pressure in the air chamber insures effective absorption of pulses. While air has been described as the preferred gas for balancing the pressure of the liquid, under some circumstances it may be desirable to use other gases, for example, nitrogen or another inert gas. It is also to be noted that while the surge suppressor is shown in a vertical position with the air chamber above the liquid chamber, it is possible to orient the axis of the chamber in any convenient manner since it can be operated in any position.

I claim:

1. A surge suppressor for liquid system comprising a liquid chamber adapted to be connected to the system and subjected to the pressure of the liquid therein, a gas chamber and a movable dividing member separating the liquid chamber from the gas chamber, said dividing member having one part subjected to the pressure in the liquid chamber and another part subjected to the pressure in the gas chamber, the said dividing member being movable in response to changes in pressure in the liquid chamber, an inlet valve for said gas chamber, said inlet valve being connected to a source of gas under pressure and being adapted when open to admit gas to said gas chamber, an outlet valve for said gas chamber adapted when open to discharge gas from said gas chamber, and means operated by said dividing member for opening said inlet valve and admitting gas into said gas chamber only during such time as said dividing member is displaced beyond a predetermined point in one direction and for opening said outlet valve to permit the discharge of gas from said gas chamber only during such time as said dividing member is displaced beyond a predetermined point in the opposite direction.

2. A surge suppressor according to claim 1 wherein the volume of said gas chamber is several times the volume displaced by said dividing member in its movement from one of said predetermined points to the other.

3. A surge suppressor for use in connection with fluid conduits comprising a liquid chamber housing open at one end and providing a liquid chamber, means for connecting the liquid chamber to a liquid system subject to surges or pulses, a gas chamber housing open at one end and providing a gas chamber, a diaphragm clamped between the open ends of said housings and separating said liquid chamber from said gas chamber, an inlet valve for said gas chamber, said inlet valve being connected to a source of gas under pressure and being adapted when open to admit gas to said gas chamber, an outlet valve for said gas chamber adapted when open to discharge gas from said gas chamber and means operated by said diaphragm for opening said inlet valve and admitting gas into said gas chamber only during such time as said diaphragm is displaced beyond a predetermined point in one direction and for opening said outlet valve to permit the discharge of gas from said gas chamber only during such time as said diaphragm is displaced beyond a predetermined point in the opposite direction.

4. A surge suppressor according to claim 3 wherein said inlet valve and said outlet valve are normally closed and are opened by said operating means.

5. A surge suppressor according to claim 3 wherein said inlet and outlet valves are opened by means including a rod secured to and reciprocated by said diaphragm.

6. A surge suppressor according to claim 3 wherein the liquid chamber housing and the gas chamber housing are shaped adjacent the diaphragm to provide conoidal surfaces to engage the diaphragm and prevent undue displacement of the diaphragm in either direction.

7. A surge suppressor according to claim 5 wherein the gas chamber is provided with a closure member for closing the end of the gas chamber opposite said diaphragm and the inl t and outlet valves are mounted in the closure member.

8. A surge suppressor according to claim 7 wherein the inlet valve is a poppet valve having a valve stem projecting within the gas chamber toward the diaphragm, said valve being openable by movement of the valve stem away from the diaphragm, said valve having means externally of said chamber for connection to a supply of compressed gas.

9. A surge suppressor according to claim 8 having an outlet valve also mounted in said closure member, said outlet valve being a poppet valve having a valve stem projecting externally of said gas chamber in a direction away from said diaphragm, said valve being openable by movement of the valve stem toward the diaphragm, said valve having a port permitting discharge of gas to the exterior of said chamber when said valve is opened.

10. A surge suppressor according to claim 9 having an actuating rod attached to said diaphragm and projecting to the exterior of said chamber, there being means in said closure member to seal against leakage of air where said actuating rod extends through said closure member, said actuating rod carrying an actuating plate within the air chamber and engageable with the valve stem of the inlet valve to open the same when the diaphragm moves toward the air chamber more than a predetermined amount and an operating plate disposed on the exterior of said chamber and adapted to engage the valve stem of the discharge valve when the diaphragm moves toward said liquid chamber more than a predetermined amount.

11. Apparatus according to claim 3 wherein the liquid system comprises an air-operated diaphragm type pump having an inlet conduit and a discharge conduit, the pump being connected to a source of compressed air and the liquid chamber of the surge suppressor being connected to the discharge conduit of the pump.

12. The combination according to claim 3 wherein the pump and the surge suppressor are connected to the same source of compressed air.

13. The combination according to claim 12 wherein the diaphragms are of the same size and type.

* * * * *